Patented June 2, 1942

2,284,822

UNITED STATES PATENT OFFICE 2,284,822

SEASONING MATERIALS

Albert Heller, Chicago, Ill., assignor to B. Heller & Company, Chicago, Ill., a corporation of Illinois No Drawing. Application May 17, 1940,
Serial No. 335,698

3 Claims. (Cl. 99—140)

This invention relates to seasoning materials and, among other objects, aims to provide an improved dry seasoning for food products such as ground meats used in the preparation of sausages, hamburgers and other meat products.

The nature of the invention may be readily understood by reference to one illustrative embodiment thereof described in the following specification.

For reasons which it is unnecessary to detail here, it is a common practice to employ in the preparation of seasonings essential flavoring oils, extracts and oleo resins obtained from natural spices. These, because of their concentration and the difficulty of uniformly distributing the small amounts necessary through the meat or other food products, are generally mixed with a dry carrier or vehicle which provides bulk and facilitates distribution through the meat.

The use of dry carriers has, however, presented other difficulties which in various ways have detracted from the advantages which otherwise accure from the use of these essential oils, etc. For example, salt and sugar and mixtures thereof have been employed as carriers. They hold the essential oils so poorly that the flavor is dissipated at a high rate both before use and after addition to the meat, and particularly during cooking. Moreover, their solubility results in immediate release of the flavoring principles upon striking moist meat surfaces with the result that their distributing function is largely lost. They do not protect the flavoring principles against oxidation or other decomposition. Flour has also been employed as a carrier but it is in the nature of an undesired foreign substance or adulterant having no flavoring or seasoning action. While flour, as well as salt and sugar, does not discolor the products to which it is added, it apparently promotes loss of flavoring and aromatic principles through oxidation and volatilization.

Various other carriers have been considered but these either darken or discolor the meat or introduce undesirable flavors.

In the illustrative seasoning I employ mutually coacting carriers which function also as seasoning and neither discolor the meat nor introduce therein what may be termed undesirable foreign substances. Moreover, these carriers are designed to effect a gradual release of the flavor and to protect the flavoring principles against oxidation and decomposition. If the flavor be released immediately, as it is with a soluble carrier, much of it is dissipated before and during cooking.

I have discovered that the combination of ground white pepper and ginger root (hereinafter referred to as ginger) functions as a carrier in an unexpectedly beneficial manner. Together they produce advantages not obtainable from either alone. Together they hold the essential oils, extracts, oleo resins and other flavoring principles tenaciously but protect them against decomposition or other impairment of their flavor and aroma. It has been particularly difficult heretofore to preserve both flavor and aroma; and unless both are preserved intact, the seasoning cannot be wholly effective. The gradual release of the flavoring principles in a manner to permit their thorough and effective permeation through and into the meat or other food is no doubt partly responsible for the superior seasoning action. I have no complete explanation of the action of these carriers, though I suspect that their structure and manner of absorbing and holding the flavoring principles is partly responsible for the results produced. Before use in meat or other foods, there seems to be no appreciable loss of potency and, as stated above, there is no appreciable decomposition. In addition, both carriers have desirable spicing action not obtainable with essential oils alone. Both are white in color and do not discolor the meat. One satisfactory preparation is made by mixing ground white pepper and ginger in the proportion of 90% by weight of the mixture of white pepper and ginger, and 10% by weight of the essential oils or other seasoning concentrates. The relative proportion of white pepper and ginger should be varied depending upon the particular flavor desired (which even varies in different parts of the country) and on the particular type of ginger employed. At the present time, a number of gingers are available, among which are Jamaica, Cochin and African. All have the power to absorb much more essential oil than need be used in the seasoning. In other words, the amount of dry carriers used to provide bulk has a surplus absorbing power in excess of that required for the amount of flavoring principles employed. The terms "essential oils" and "oleo resins" are intended to embrace other liquid seasoning principles in concentrated form.

This application is a continuation in part of my copending application, Serial No. 273,314.

Obviously the invention is not limited to the details of the illustrative embodiment thereof herein described since these may be variously modified. Moreover, it is not indispensable that all features of the invention be used conjointly since various features may be embodied in different combinations and sub-combinations.

Having described my invention, I claim:

1. A method of preserving the potency of seasoning for meats which comprises absorbing a small amount of essential oils, in an insoluble carrier so as to prevent immediate release of the essential oils upon contact with meat surfaces, said carrier consisting of dry comminuted white pepper and ginger which function by absorption to protect the essential oils against oxidation before use.

2. The method of preserving the potency of small amounts of flavoring substances in a seasoning which comprises distributing oleo resins throughout a major amount of insoluble carrier spice capable of holding the oleo resins against immediate release when in contact with moist surfaces, and preventing oxidation of the same before use by absorption in the carrier, said carrier spice comprising dry comminuted white pepper and ginger.

3. A stable seasoning for meats comprising in combination a light colored spice carrier consisting of dry comminuted white paper and ginger, and essential oils absorbed in said carrier to prevent oxidation of the essential oils before use, said carrier being insoluble to retard release of the essential oils upon contact with moist meat surfaces.

ALBERT HELLER.